(12) United States Patent
Tandon et al.

(10) Patent No.: US 8,890,926 B2
(45) Date of Patent: Nov. 18, 2014

(54) AUTOMATIC IDENTIFICATION AND REPRESENTATION OF MOST RELEVANT PEOPLE IN MEETINGS

(75) Inventors: Ankit Tandon, Bellevue, WA (US); Prarthana Panchal, Seattle, WA (US); Sarah Zuberec, Seattle, WA (US); Jason Tuck, Kirkland, WA (US); Michael Hill, Shoreline, WA (US); Andrew Davis, Bothell, WA (US); Santhosh Raman, Redmond, WA (US); Marcelo Ivan Garcia, Snoqualmie, WA (US); Nicolae Velea, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 13/351,159

(22) Filed: Jan. 16, 2012

(65) Prior Publication Data

US 2013/0106985 A1     May 2, 2013

Related U.S. Application Data

(60) Provisional application No. 61/554,574, filed on Nov. 2, 2011.

(51) Int. Cl.
*H04N 7/15* (2006.01)
*H04L 12/18* (2006.01)

(52) U.S. Cl.
CPC ............ *H04N 7/157* (2013.01); *H04L 12/1827* (2013.01)
USPC ........................................ 348/14.08; 709/204

(58) Field of Classification Search
CPC ............... H04L 12/1827; H04L 51/16; H04M 2201/38; H04M 2201/40; H04M 2203/5081; H04N 7/157; G06N 5/043; G10L 2015/228

USPC ....................................... 709/204; 379/202.01
See application file for complete search history.

(56) References Cited

U.S. PATENT DOCUMENTS

| 2005/0125246 | A1 | 6/2005 | Muller et al. |
| 2007/0106724 | A1* | 5/2007 | Gorti et al. ..................... 709/204 |

(Continued)

FOREIGN PATENT DOCUMENTS

| JP | 2008539488 A | 11/2008 |
| KR | 20060114986 A | 11/2006 |

(Continued)

OTHER PUBLICATIONS

"International Search Report", Mailed Date: Feb. 20, 2013, Application No. PCT/US2012/062504, Filed Date: Oct. 30, 2012, pp. 10.

(Continued)

*Primary Examiner* — Mohammad Islam
(74) *Attorney, Agent, or Firm* — Andrew Smith; Jim Ross; Micky Minhas

(57) ABSTRACT

The "relevant" participants for each person in an online meeting may be automatically identified and a personalized view created to dynamically represent these relevant people as the meeting progresses. Relevancy of participants may be determined based on a number of factors and data from a variety of sources at the initialization of the meeting or when the participant for whom the personalized view is created joins the meeting. The relevancy computation may be updated and the personalized view dynamically changed during the meeting based on changes in participants, their participation modality, and comparable factors.

20 Claims, 9 Drawing Sheets

(56) References Cited

U.S. PATENT DOCUMENTS

2011/0270922 A1    11/2011  Jones et al.
2012/0102050 A1*  4/2012  Button et al. ............ 707/749
2013/0018840 A1*  1/2013  Averbuch ................. 707/602

FOREIGN PATENT DOCUMENTS

| | | |
|---|---|---|
| KR | 20070040512 A | 4/2007 |
| KR | 20100027775 A | 3/2010 |
| WO | 2007114788 A1 | 10/2007 |

OTHER PUBLICATIONS

Folk-Wjlhams, John, "Real-Time Online Video Meetings", Retrieved at <<http://www.crosscollaborate.com/2009/11/real-time-online-video-meetings/>>, Nov. 13, 2009, pp. 6.

"SIPthat", Open and Secure Alternative to Skype, Retrieved at <<http://sipthat.com/tag/avaya/>>, Retrieved Date: Nov. 9, 2011, pp. 9.

Rayford, Meg, "Use Sonar to Connect with People Nearby", Retrieved at <<http://techcocktail.com/find-common-connections-with-sonar-2011-06>>, Jun. 5, 2011, pp. 10.

Noulas, et al., "Multimodal Speaker Diarization", Retrieved at <<http://ieeexplore.ieee.org/stamp/stamp.jsp?tp=&arnumber=5728824>>, IEEE Transactions on Pattern Analysis and Machine Intelligence, Jan. 24, 2011, pp. 1-36.

Binny, "5 Free Group Video Chat Software for Free Video Conferencing", Retrieved at <<http://www.ilovefreesoftware.com/09/featured/5-free-group-video-chat-software-for-free-video-conferencing.html>>, Jan. 9, 2011, pp. 8.

* cited by examiner

AUTOMATIC IDENTIFICATION AND REPRESENTATION OF MOST RELEVANT PEOPLE IN MEETINGS

CROSS REFERENCE TO RELATED APPLICATIONS

This application claims the benefit of U.S. Provisional Patent Application Ser. No. 61/554,574 filed on Nov. 2, 2011. The disclosures of the provisional patent application are hereby incorporated by reference for all purposes.

BACKGROUND

In meetings with more than a few people, all meeting participants are not "relevant" to each person at all times. Each person in the meeting could have a different set of "relevant" people in the meeting whom they care about. For example, the person who is talking might be the most "relevant" to all others at that moment. But the person who is being talked to (the one listening) can be "relevant" too. Because of the nature of the meeting, a decision maker in the meeting could also be "relevant" to an observer. Or, to a person, the reaction of their boss in the meeting might be "relevant". During the meeting, participants have to keep track of who is most "relevant" at that moment—e.g. whose reaction needs to be observed In online meetings, where all people are remotely participating, there are additional constraints which make this task more difficult. Due to limitations in the available bandwidth and due to limitations in the available display space, not every person in the meeting can see every other person in the meeting at the same time. By the virtue of these limitations, a subset of people in the online meeting can be seen by the others. Since the online meeting is being conducted in a virtual space, noticing the non-verbal cues (body language) of these "relevant" subset of people in the meeting is even more important.

To remedy this, most current online meeting tools provide an option to focus on the loudest talker. Some online meeting tools additionally provide an option to show a set of up to a number of (e.g. 10) pre-selected individuals simultaneously. But these tools have several limitations. One limitation of these tools is that they only use "audio activity" to determine who is "relevant"—that is, they assume that the loudest talker is the most "relevant" person. Even if the online meeting tool provides an option to show more than one person simultaneously, the tool usually does not allow the participants in the meeting to choose their own set of "relevant" people—that is, people have to see the participants who were pre-selected by the tool or by the organizer. Another disadvantage of the current online meeting tools is that the set of "relevant" people in the meeting is not personalized automatically for each participant—so participants have to compile their "relevant" set themselves throughout the meeting. Additionally, when someone new joins an ongoing meeting, it takes a few minutes before that new person understands the dynamics of the ongoing meeting and before that new person determines whom to focus on during the meeting.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automatically identifying the "relevant" participants for each person in an online meeting and creating a personalized view to dynamically represent these "relevant" people as the meeting progresses. Relevancy of participants may be determined based on a number of factors and data from a variety of sources at the initialization of the meeting or when the participant for whom the personalized view is created joins the meeting. The relevancy computation may be updated and the personalized view dynamically changed during the meeting based on changes in participants, their participation modality, and comparable factors.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
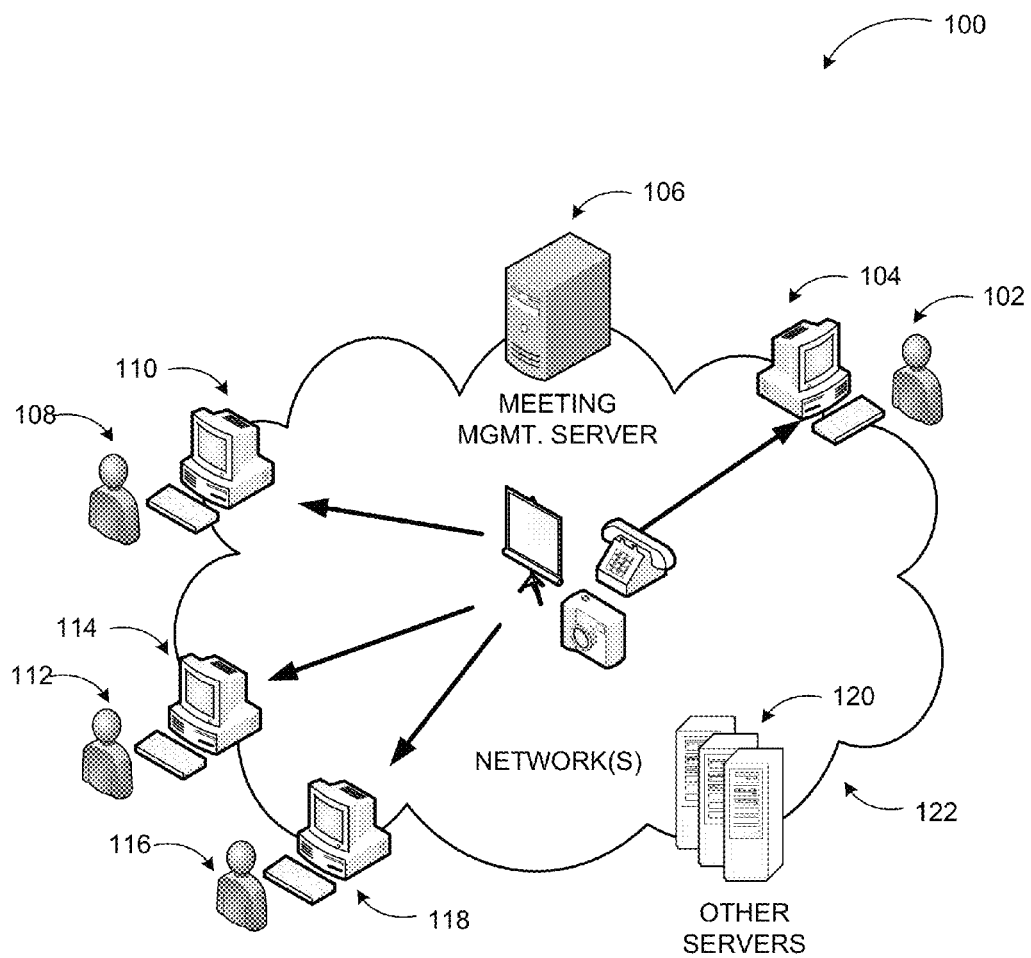
FIG. 1 is a conceptual diagram illustrating an online meeting system, where embodiments may be implemented for personalizing participant presentation.

As briefly described above, "relevant" participants for each person in an online meeting may be automatically identified and a personalized view may be created to dynamically represent these "relevant" people as the meeting progresses.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for facilitating online meetings where most relevant participants may be determined for a participant and a personalized view provided based on the relevancy of the other participants. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. Furthermore, the term "online meeting" refers to any meeting with an online component, where audio, video, application, data, and similar components may be shared over one or more networks between participants. Indeed, in some scenarios, participants may not need to be online during an actual meeting.

According to some embodiments, "relevant" people may be determined by a smart initialization module to create the "gallery" when a new participant joins an ongoing meeting by using one or more criteria. According to other embodiments, "relevant" people for a participant may also be automatically identified during the online meeting using several criteria. Further embodiments are directed to dynamic representation of all people during an online meeting such that the "relevant" people in a meeting are the focus. Yet other embodiments are directed to custom personalization of the set of "relevant" people during an online meeting.

FIG. 1 is a conceptual diagram illustrating an online meeting system, where embodiments may be implemented for personalizing participant presentation. An online meeting system according to embodiments may be implemented as part of a unified communication system. A unified communication system is an example of modern communication systems with a wide range of capabilities and services that can be provided to subscribers. A unified communication system is a real-time communications system facilitating instant messaging, presence, audio-video conferencing, data sharing conferencing, web conferencing, and similar functionalities.

In a unified communication ("UC") system, users may communicate via a variety of end devices, which are client devices of the UC system. Each client device may be capable of executing one or more communication applications for voice communication, video communication, instant messaging, application sharing, data sharing, and the like. In addition to their advanced functionality, the end devices may also facilitate traditional phone calls through external connections. End devices may include any type of smart phone, cellular phone, slate, netbook, any computing device executing a communication application, a smart automobile console, and advanced phone devices with additional functionality.

In addition to facilitating participation in an online meeting, the end devices may handle additional communication modes such as instant messaging, video communication, etc. While any protocol may be employed in a UC system, Session Initiation Protocol (SIP) is a commonly used method to facilitate communication. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

In the example online meeting system of diagram 100 in FIG. 1, meeting management server 106 may facilitate an online meeting that includes one or more modalities. One or more participants 102, 108, 112, and 116 may communicate with each other during the online meeting through text messaging, audio communication, video communication, data sharing, whiteboard sharing, application sharing, and so on. Participants 102, 108, 112, and 116 may view the presentation through communication/collaboration applications executed on client devices 104, 110, 114, and 118. A system according to some embodiments may accommodate multi-directional data sharing, where participants may perform the actions assumed by a presenter at different times. Communication/collaboration applications for the presenter and the participants may also be a centralized or distributed service executed by conference management server 106 or by the other servers 120. Other servers 120 may assist conference management server 106 manage the online conference system over network(s) 122 and/or perform other tasks such as those discussed above in conjunction with an enhanced communication system.

While the example system in FIG. 1 has been described with specific components such as meeting management server and similar devices, embodiments are not limited to these components or system configurations and can be implemented with other system configuration employing fewer or additional components. Functionality of systems providing automatic identification and representation of most relevant people in an online meeting may also be distributed among the components of the systems differently depending on component capabilities and system configurations. Furthermore, embodiments are not limited to unified communication systems. The approaches discussed here may be applied to any data exchange in a networked communication environment using the principles described herein.

Figure 2:
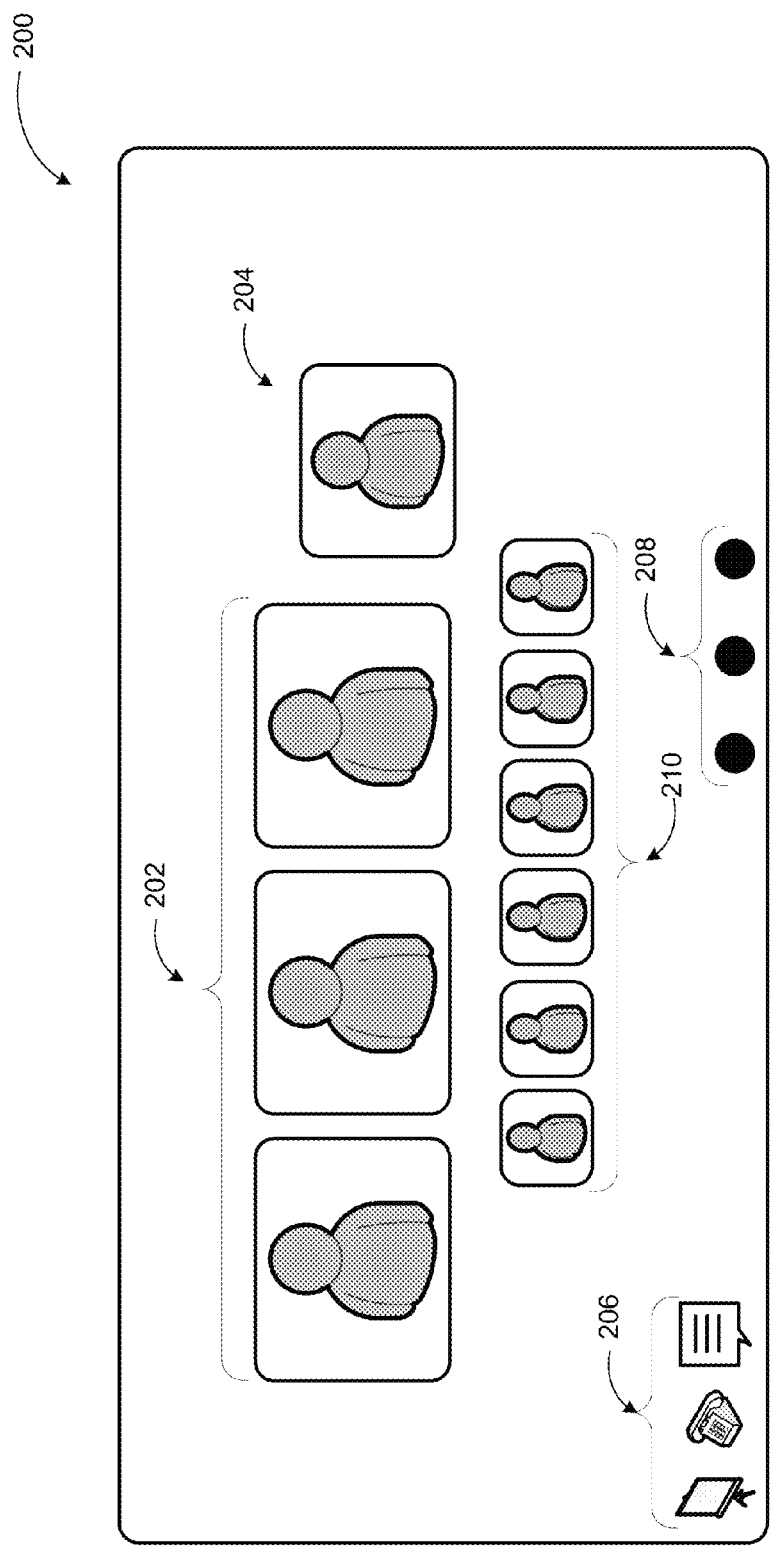
FIG. 2 illustrates an example "gallery" presenting a personalized view of participants in an online meeting to a particular participant, where the participants are categorized and presented according to their relevancy to the particular participant.

FIG. 2 illustrates an example "gallery" presenting a personalized view of participants in an online meeting to a particular participant, where the participants are categorized and presented according to their relevancy to the particular participant.

According to some embodiments, relevant people may be determined by a smart initialization module to create the gallery when a new participant joins an ongoing meeting by using one or more criteria. Example user interface 200 shows such a gallery displaying participants and example user interface controls. The user interface controls may include control elements 206 for adding/removing/changing modalities of the online meeting, and other controls 208 (e.g. changing the relevancy of the displayed participants, changing views of the gallery (1-row, 2-rows, 3D etc.), changing the top row of the gallery from several slots to a single slot, showing/hiding names on participants in the gallery etc.). The displayed participants may be grouped as most relevant people 202, self-representation 204 of the user associated with the user interface 200, and other participants (i.e., less relevant people) 210. In the example configuration displayed on FIG. 2, the most relevant people are displayed in larger size on a top row of a two-row representation. Less relevant people are displayed using smaller size at the bottom row.

The relevancy of the people may be determined by an initialization module at the beginning of the online meeting based on a history of participation by the people in the meeting thus far as determined by their activity on all the different modalities available in the meeting including text message, audio, video, data sharing, etc.; a likelihood of participation by the people in the meeting moving forward as determined by the modalities that the people have joined with (e.g. data-sharing, video, audio only, text message only etc.), an active status of the modalities (e.g. is microphone muted/unmuted, is camera turned on/off), role of the people in the meeting (e.g. organizer, presenter, attendee) etc.; an organizational relationship of people in the meeting with the participant (e.g., are they in the same team, what is the organizational hierarchy, who is the boss? etc.); and/or a behavior and social relationship of people in the meeting with the participant (e.g., how frequently do they communicate, when was the last communication, was there any communication on the topic of the meeting etc.).

According to other embodiments, relevant people for a participant may also be automatically identified during the online meeting using several criteria including, but not limited to a participation of people in the meeting as determined by their activity on all the different modalities available in the meeting including text message, audio, video, data sharing, etc.; an organizational relationship of people in the meeting with the participant (e.g., are they in the same team, what is the organizational hierarchy, who is the boss? etc.); and/or a behavioral and social relationship of people in the meeting with the participant (e.g., how frequently do they communicate, when was the last communication, was there any communication on the topic of the meeting etc.).

Further embodiments are directed to dynamic representation of all people during an online meeting such that the relevant people in a meeting are the focus. This may be accomplished through the gallery, which is a rich representation of all people in the meeting using their avatar, their photo, or their video. The gallery aims to represent each person in the online meeting equally regardless of how the participant has joined the conference (e.g. from whatever endpoint etc.) and regardless of how the participant is projecting themselves in the meeting (e.g. with whatever modalities like text message, audio, video, data sharing etc.).

The top row 202 and the bottom row 210 may also be referred to as the "Standing" and "Sitting" rows in the "Gallery." In a large online meeting, use of standing and sitting rows in the gallery may help delineate the most relevant people from the rest. As the meeting progresses, more relevant people may automatically move from the sitting row to the standing row—and less relevant people may move from the standing row to the sitting row. This may happen as people join/leave the meeting, and as people change the level of participation in the meeting. The size of the gallery including the number of relevant people in the standing row may be dynamically adjusted based on the available display surface (size, resolution etc.), based on available network (bandwidth, packet loss, latency etc.) and based on local endpoint resources (processors, memory, display drivers, graphics acceleration etc.).

Representation 204 in FIG. 2 may also be referred as "Me". "Me" is a representation of self in the list of participants in the meeting. It may be intentionally placed in a spot next to everyone else in the gallery so that the user can have a first-person view of all the other participants in the meeting. This "Me" representation does not dynamically move around in the gallery—so that it is in a predictable spot for the user to quickly glance at their video preview. Participants in the gallery may have a speaker indicator showing which participants are active in the conversation at any given point in time.

Yet other embodiments are directed to custom personalization of the set of relevant people during an online meeting by allowing participants in the online meeting to identify the people in the meeting who are more relevant to them—so that the gallery can keep these relevant people in the "Standing" row—and/or giving participants in the online meeting the ability to create personalized views of people in the meeting, that is, ability to customize views of the gallery.

Figure 3:
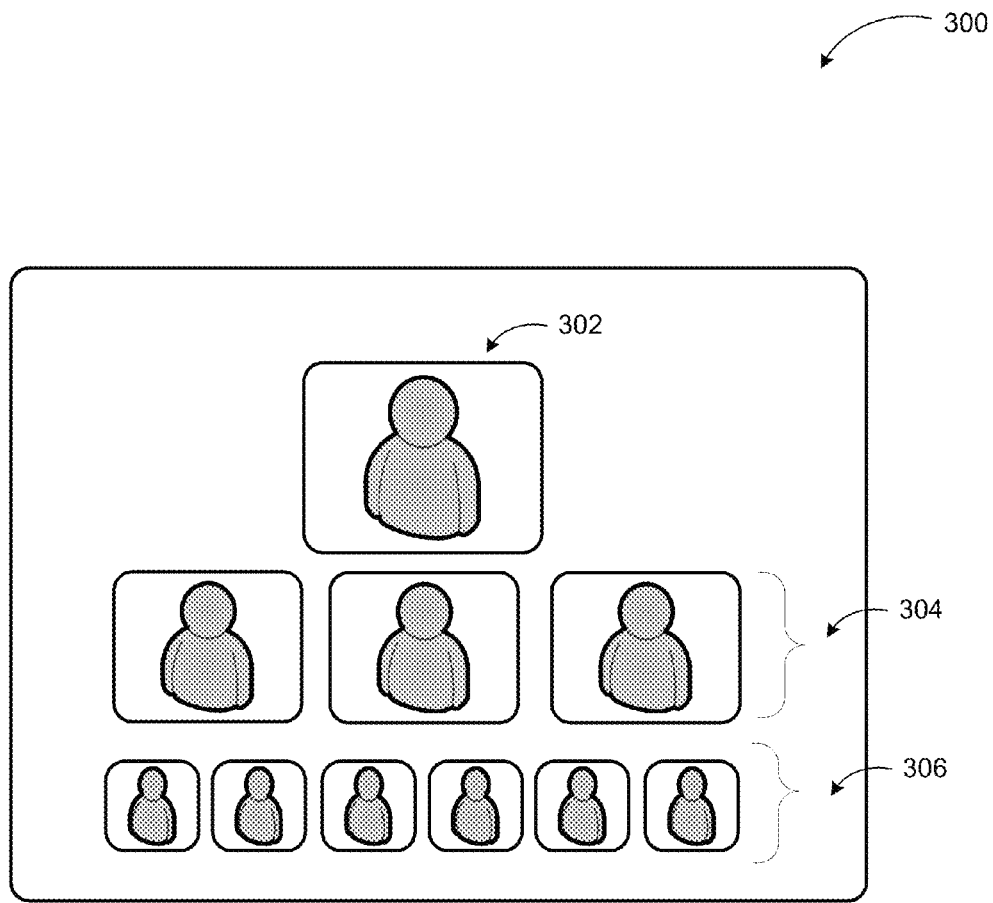
FIG. 3 illustrates another example "gallery", where three levels of relevant participants are represented.

FIG. 3 illustrates another example "gallery", where three levels of relevant participants are represented. A gallery according to embodiments may be configured in various ways to present relevant and less relevant participants in an online meeting as mentioned above. The determination of relevancy and a size and format of how people are presented may be determined dynamically based on a number of factors.

Gallery 300 shows one example configuration, where a most relevant person is presented with a largest size photo/video/avatar at a top row 302 of the gallery 300. Participants of a next relevancy level are presented at a middle row 304 of the gallery 300, followed by the participants of least relevancy presented at a bottom row 306 of the gallery 300. In other embodiments, additional rows may be employed to present additional levels of relevancy. Embodiments are not limited to presenting participants grouped in rows. Other configurations such as columns, irregular groupings, and similar ones may also be used to emphasize different relevancies of meeting participants to a user associated with a user interface presenting the gallery.

Figure 4:
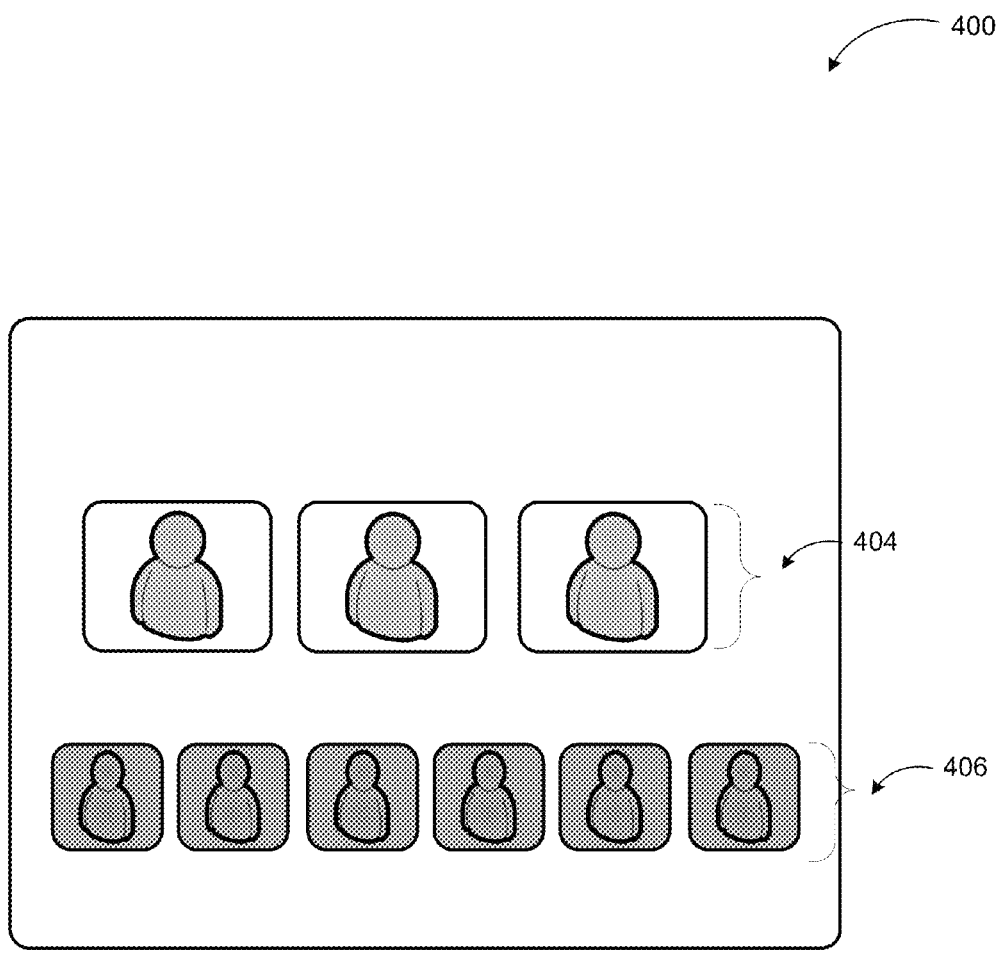
FIG. 4 illustrates a further example "gallery", where two levels of relevant participants are displayed at two distinct levels.

FIG. 4 illustrates a further example "gallery", where two levels of relevant participants are displayed at two distinct levels. In addition to using two or more rows (or columns) to present meeting participants of different relevancies, a system according to embodiments may employ one or more schemes to emphasize participant relevancies.

In the example gallery 400, three (most) relevant people are presented at the top row 404 while a number of less relevant people are presented at the bottom row 406. Differently from the example of FIG. 2, the gallery 400 utilizes a shading or background scheme to emphasize the different relevancies. The most relevant people at the top row 404 are displayed with a lighter background (and more contrast), while the less relevant people at the bottom row 406 are displayed with a darker background (and less contrast) focusing a user's attention on the top row 404.

A system according to embodiments may employ one or more schemes to further emphasize participant relevancy (in addition to the spatial differentiation provided by the different rows). For example, a shading scheme, a color scheme, a graphical scheme (e.g., use of different graphical elements, accents, borders, etc.), and/or even a textual scheme (e.g., display of participant names using different font styles/sizes/attributes) may be employed to provide additional emphasis on the distinction between more and less relevant participants.

Figure 5:
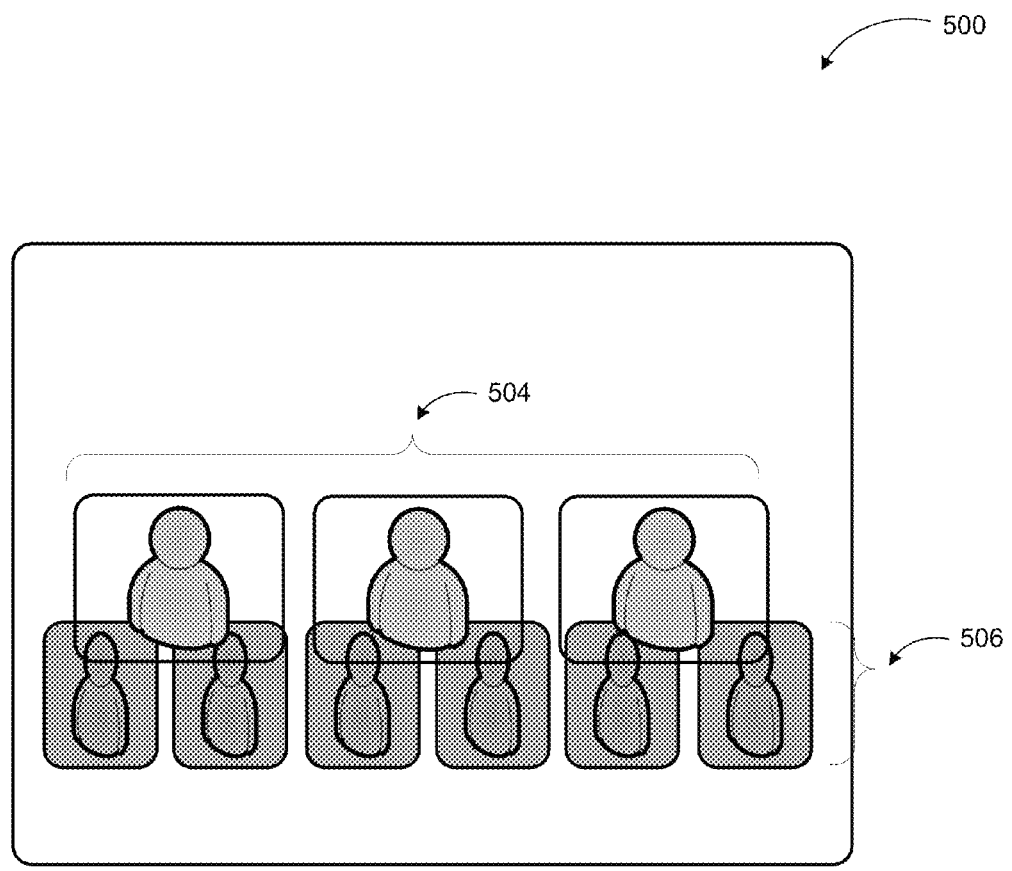
FIG. 5 illustrates yet another example "gallery", where two levels of relevant participants are displayed with the most relevant participants overlapping with the less relevant participants.

FIG. 5 illustrates yet another example "gallery", where two levels of relevant participants are displayed with the most relevant participants overlapping with the less relevant participants.

In some embodiments, a combination of one or more of the schemes discussed above and the spatial differentiation may be employed to focus the user's attention to the more relevant people. In the example gallery 500, the presentation of the most relevant people at top row 504 overlaps with the less relevant people at the bottom row 506. This further focuses the attention on the most relevant people deemphasizing the less relevant people at the bottom row 506. The overlapping may be combined with changing a size of each participant's representation. The overlapping (and/or size change) may also be employed in response to a change in available display size. For example, the rows may overlap if the available display size is below a predefined threshold.

Figure 6:
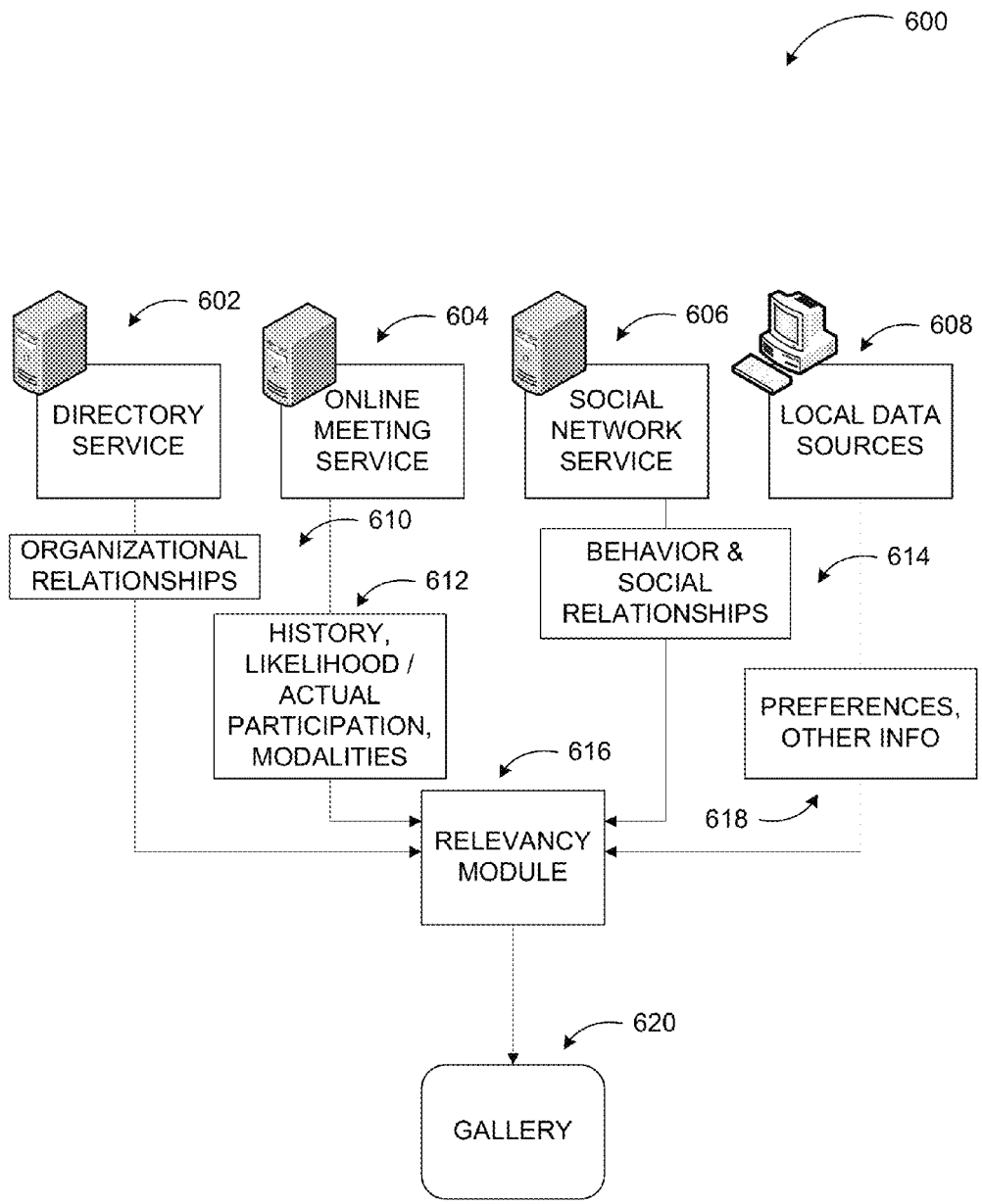
FIG. 6 is a block diagram illustrating example interactions between major components of a system according to embodiments in determining relevant participants and creating their representation.

FIG. 6 is a block diagram illustrating example interactions between major components of a system according to embodiments in determining relevant participants and creating their representation.

As discussed previously, relevant people may be determined at the initialization of an online meeting involving online as well as real participants by a relevancy module 616 to create the gallery 620 based on expected participants. The relevancy may be dynamically updated when a new participant joins an ongoing meeting, an existing participant leaves the meeting, a participation level of a participant changes a modality of a participant change, or a viewing user preference changes by using one or more criteria.

The criteria may take into account information obtained from one or more sources. For example, organizational relationships 610 between the participants may be determined based data obtained from a directory service 602. A history of, a likelihood of, and/or an actual participation of the participants, as well as modalities (audio, video, data sharing, text messaging, etc.) employed by the participants (612) may be obtained from an online meeting service 604.

Information associated with behavior and social relationships between participants (614) may be obtained from one or more social network services 606. For example, common interests, location data, etc. for different participants may be determined this way. User preferences and other information 618 such as display capabilities, local endpoint resources (processors, memory, display drivers, graphics acceleration etc.), user location, etc. may be retrieved from local data sources 608 such as installed applications, data files, etc. on the user's computing device.

According to other embodiments, "relevant" people for a participant may also be automatically identified during the online meeting using several criteria. Further embodiments are directed to dynamic representation of all people during an online meeting such that the "relevant" people in a meeting are the focus. Yet other embodiments are directed to custom personalization of the set of "relevant" people during an online meeting The examples in FIG. 2 through FIG. 6 have been described with specific user interface elements, configurations, and presentations. Embodiments are not limited to systems or methods according to these example configurations and may be implemented in configurations using other types of user interface elements, presentations, and configurations in a similar manner using the principles described herein.

Figure 7:
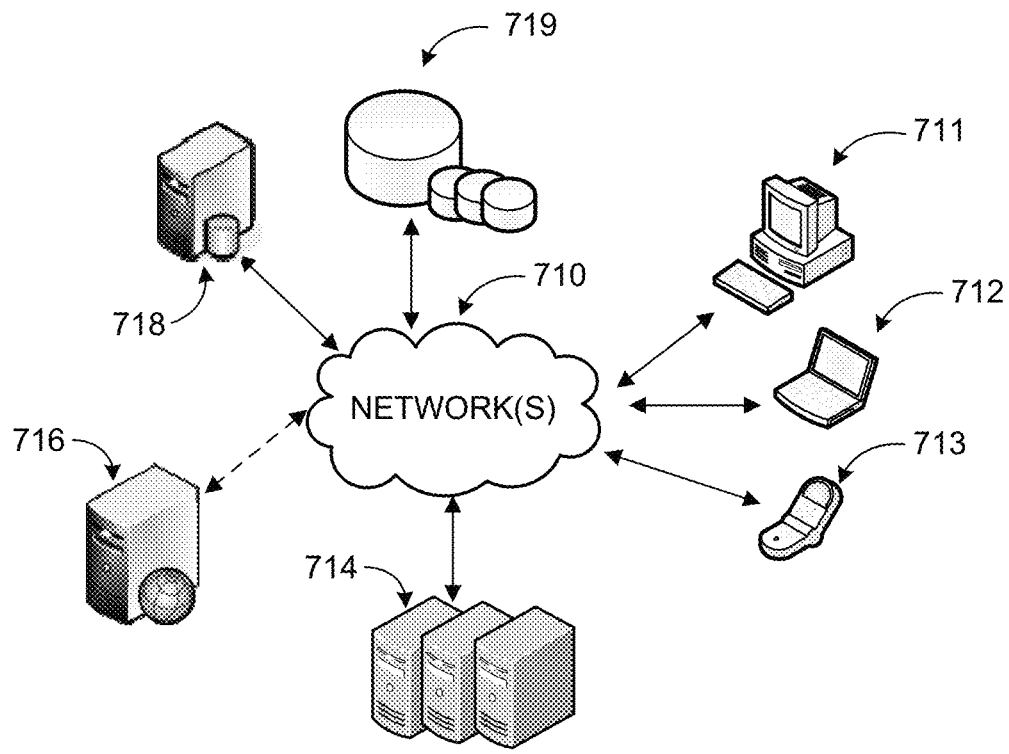
FIG. 7 is a networked environment, where an online meeting system according to embodiments may be implemented.

FIG. 7 is an example networked environment, where embodiments may be implemented. A system for automatically identifying and representing most relevant people in online meetings may be implemented via software executed over one or more servers 714 such as a hosted service. The system may employ a peer-to-peer, a web based, or other configurations. The platform may communicate with client applications on individual computing devices such as a smart phone 713, a laptop computer 712, slate, netbook, or desktop computer 711 ('client devices') connected through network(s) 710.

Client applications executed on any of the client devices 711-713 may facilitate communications via application(s) executed by servers 714, or on individual server 716. An application executed on one of the servers may facilitate online meetings. A relevancy module may automatically identify and represent most relevant people in the online meeting through a gallery as described herein. Relevant data may be retrieved from data store(s) 719 directly or through database server 718, and provide requested services (e.g. document editing) to the user(s) through client devices 711-713.

Network(s) 710 may comprise any topology of servers, clients, Internet service providers, and communication media. A system according to embodiments may have a static or dynamic topology. Network(s) 710 may include secure networks such as an enterprise network, an unsecure network such as a wireless open network, or the Internet. Network(s) 710 may also coordinate communication over other networks such as Public Switched Telephone Network (PSTN) or cellular networks. Furthermore, network(s) 710 may include short range wireless networks such as Bluetooth or similar ones. Network(s) 710 provide communication between the nodes described herein. By way of example, and not limitation, network(s) 710 may include wireless media such as acoustic, RF, infrared and other wireless media.

Many other configurations of computing devices, applications, data sources, and data distribution systems may be employed to implement a platform providing automatically identifying and representing most relevant people in online meetings. Furthermore, the networked environments discussed in FIG. 7 are for illustration purposes only. Embodiments are not limited to the example applications, modules, or processes.

Figure 8:
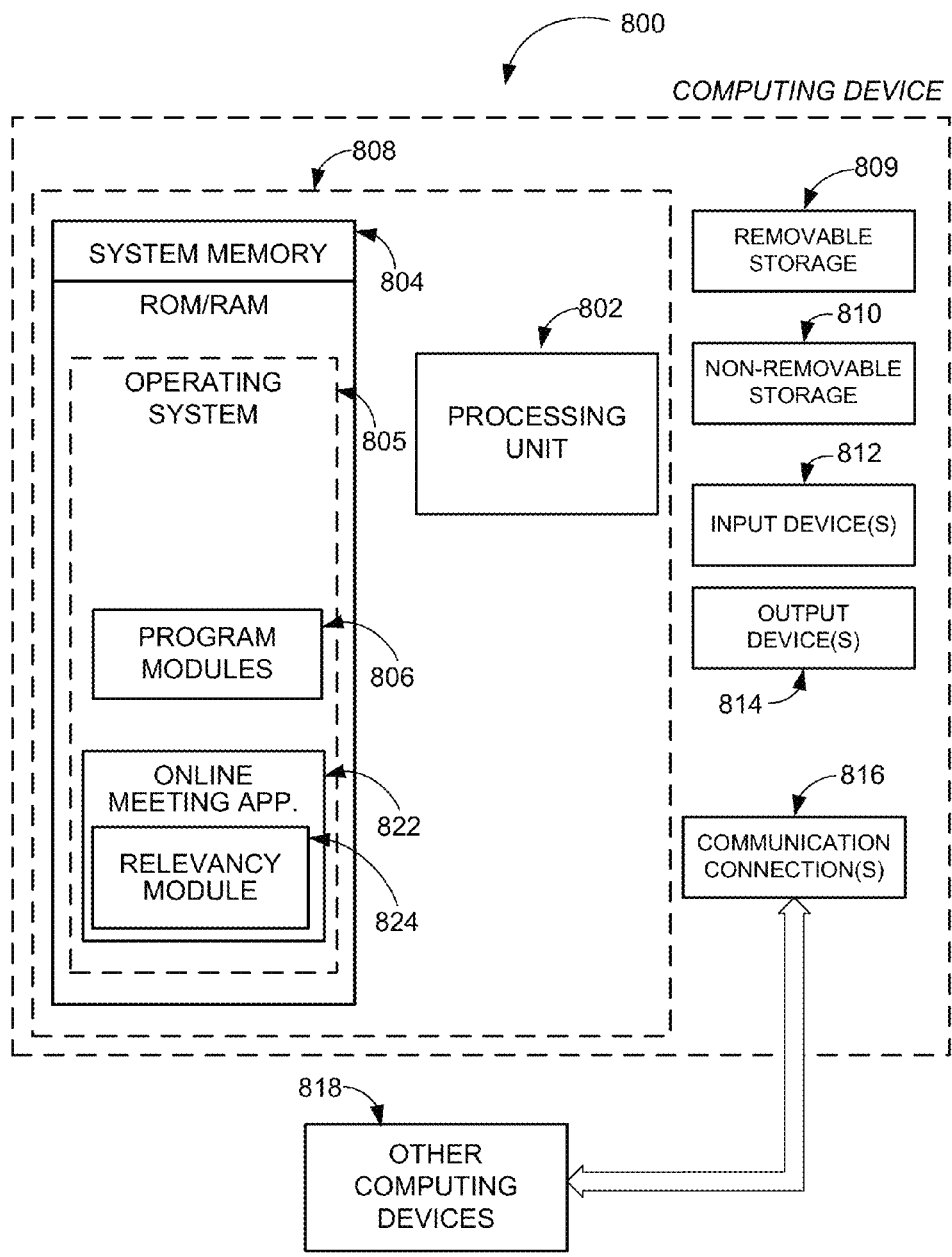
FIG. 8 is a block diagram of an example computing operating environment for online meetings with automatic identification and representation of participants according to their relevancy, where embodiments may be implemented.

FIG. 8 and the associated discussion are intended to provide a brief, general description of a suitable computing environment in which embodiments may be implemented. With reference to FIG. 8, a block diagram of an example computing operating environment for an application according to embodiments is illustrated, such as computing device 800. In a basic configuration, computing device 800 may be any computing device executing an application facilitating online meetings according to embodiments and include at least one processing unit 802 and system memory 804. Computing device 800 may also include a plurality of processing units that cooperate in executing programs. Depending on the exact configuration and type of computing device, the system memory 804 may be volatile (such as RAM), non-volatile (such as ROM, flash memory, etc.) or some combination of the two. System memory 804 typically includes an operating system 805 suitable for controlling the operation of the platform, such as the WINDOWS® operating systems from MICROSOFT CORPORATION of Redmond, Wash. The system memory 804 may also include one or more software applications such as program modules 806, meeting application 822, and relevancy module 824.

Relevancy module 824 may automatically identify and represent most relevant people in online meetings for other participants as discussed above. Meeting application 822 and relevancy module 824 may be separate applications or integrated modules of a hosted service. This basic configuration is illustrated in FIG. 8 by those components within dashed line 808.

Computing device 800 may have additional features or functionality. For example, the computing device 800 may also include additional data storage devices (removable and/or non-removable) such as, for example, magnetic disks, optical disks, or tape. Such additional storage is illustrated in FIG. 8 by removable storage 809 and non-removable storage 810. Computer readable storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 800. Any such computer readable storage media may be part of computing device 800. Computing device 800 may also have input device(s) 812 such as keyboard, mouse, pen, voice input device, touch input device, and comparable input devices. Output device(s) 814 such as a display, speakers, printer, and other types of output devices may also be included. These devices are well known in the art and need not be discussed at length here.

Computing device 800 may also contain communication connections 816 that allow the device to communicate with other devices 818, such as over a wired or wireless network in a distributed computing environment, a satellite link, a cellular link, a short range network, and comparable mechanisms. Other devices 818 may include computer device(s) that execute communication applications, web servers, and comparable devices. Communication connection(s) 816 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 9:
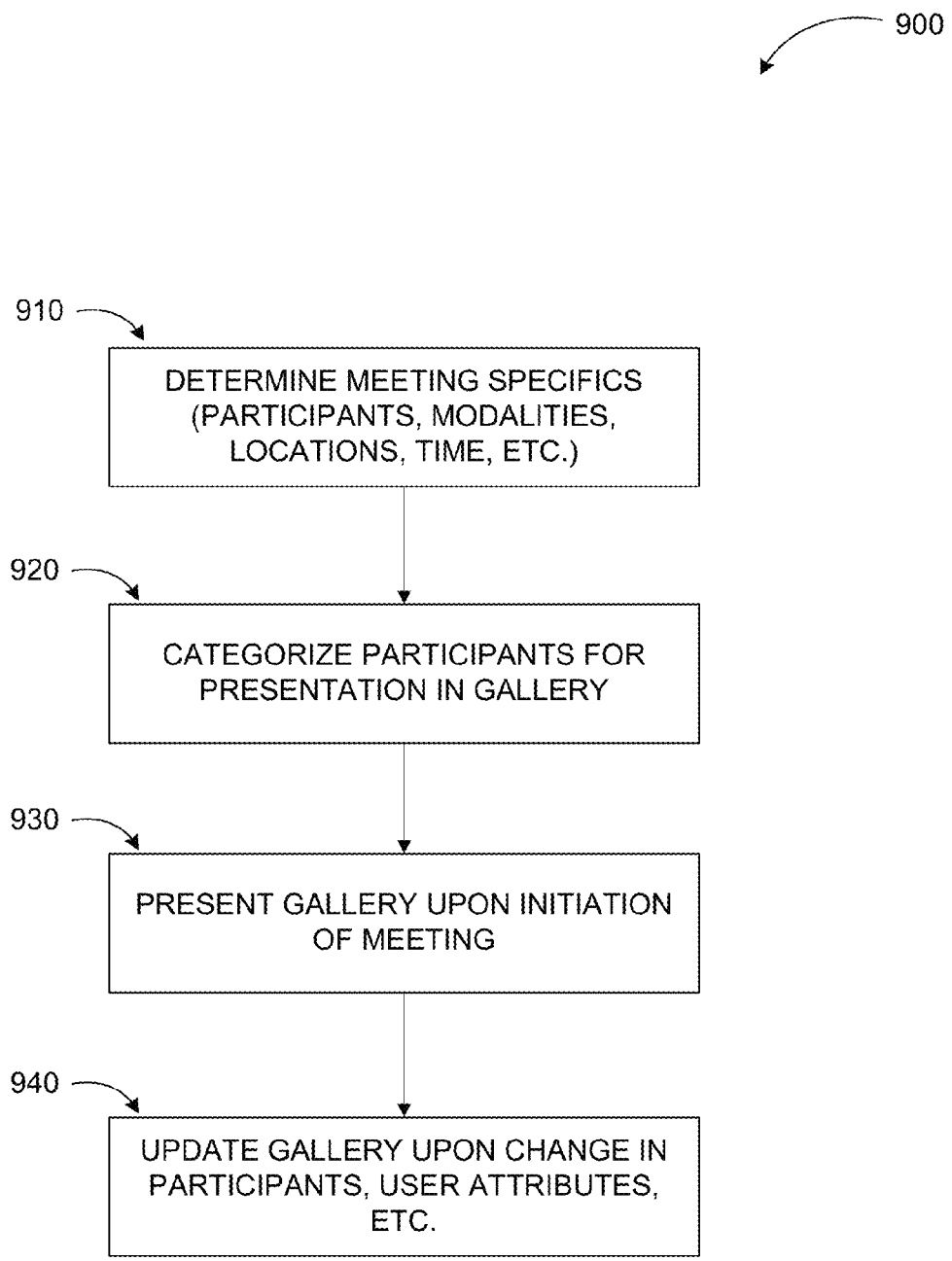
FIG. 9 is a flowchart of a process for determining and presenting most relevant people in an online meeting according to embodiments.

FIG. 9 is a flowchart of a process for determining and presenting most relevant people in an online meeting according to embodiments. A process according to embodiments may be executed by a relevancy module locally installed at a user computing device or at a hosted service.

Process 900 may begin with operation 910, where meeting specifics such as identities of participants, employed modalities, locations or participants, time of the meeting, and so on may be determined Operation 910 may be followed by operation 920, where the participants may be categorized into two or more groups such as "most relevant" participants and "less relevant" participants for presentation of the participants in a customized gallery.

Operation 920 may be followed by operation 930, where the gallery may be presented upon initiation of the meeting. The gallery may emphasize a difference between relevancies of the participants employing a spatial distinction (e.g., different rows) and/or one or more schemes as discussed herein. Operation 930 may be followed by operation 940, where the presentation of the participants on the gallery may be updated based on changes in the participants, user attributes/preferences, and one or more additional factors.

The operations included in process 900 are for illustration purposes. Automatic identification and representation of most relevant people in meetings according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed in a computing device for presenting participants of a meeting according to their relevancy, the method comprising:
    determining the participants of the meeting;
    categorizing the participants according to their relevancy for a user based on a first set of factors;
    presenting the participants on a meeting user interface gallery by emphasizing the relevancy categories employing a spatial grouping scheme;
    placing a representation of the user next to the participants on the gallery to provide the user with a first person view of the participants; and updating the gallery during the meeting based on a second set of factors.

2. The method of claim 1, further comprising:
enabling the user to modify at least one from a set of: the relevancy categories, the spatial grouping scheme, and a format of the gallery.

3. The method of claim 1, further comprising:
employing at least one from a set of: a shading scheme, a color scheme, a graphical scheme, a three dimensional (3D) scheme, and a textual scheme in addition to the spatial grouping scheme.

4. The method of claim 1, wherein the first set of factors include one or more of: a history of participation by the participants in the current meeting, a history of participation by the participants in previous similar meetings, a likelihood of participation of the participants in the meeting moving forward, an organizational relationship between the participants and the user, a behavior and a social relationship of the participants regarding the user, and a preference of the user.

5. The method of claim 4, wherein the history of participation and the likelihood of participation include at least one from a set of: a modality of participation, an active status of each modality, and a role of each participant.

6. The method of claim 5, wherein the modalities include one or more of a text messaging, an audio communication, a video communication, and a data sharing session.

7. The method of claim 5, wherein the active status of the modalities include one or more of a muting status of a microphone, a muting status of a speaker, an on/off status of a camera, a movement in front of the camera, a sharing of slides, a use of a tele-pointer, an annotation on whiteboard, and a status of a conversation.

8. The method of claim 5, wherein the role of each participant includes one of: an organizer, a presenter, and an attendee.

9. The method of claim 5, wherein the behavior and social relationship of the participants includes one or more of: a frequency of communication between a participant and the user, a timing of a last communication between the participant and the user, whether a communication on a topic of the meeting took place, and a modality of past communications between the participant and the user.

10. The method of claim 1, wherein the second set of factors include one or more of: a modality of participation by the participants comprising one or more of text messaging, audio, video, and data sharing, a change of modality, an activity within each modality by the participants comprising one of typing, talking, moving in front of the camera, sharing of slides, using a tele-pointer, and annotating on a whiteboard, a change in participants, an organizational relationship between a new participant and the user, a behavior and a social relationship of a new participant with the user, and an input from the user.

11. The method of claim 1, wherein the spatial grouping scheme includes presentation of one of an avatar, a photo, and a video of each participant in one or more spatially distinct groups based on their relevancy.

12. The method of claim 11, wherein the spatially distinct groups are one of rows of participant presentations, columns of participant presentations, and irregularly shaped groups of participant presentations.

13. The method of claim 1, further comprising:
dynamically adjusting at least one from a set of: a size of the gallery, a configuration of the gallery, and the spatial grouping scheme based on an available display surface, an available network bandwidth, a packet loss, a latency, and local endpoint resources comprising one or more of processors, memory, display drivers, and graphics acceleration.

14. A computing device for presenting participants of a meeting according to their relevancy, comprising:
a memory storing instructions;
a processor coupled to the memory, the processor executing an online meeting presentation application in conjunction with the stored instructions, wherein the online meeting presentation application is configured to:
determine the participants of the meeting;
categorize the participants according to their relevancy for a user based on one or more of: a history of participation by the participants in similar meetings, a likelihood of participation of the participants in the meeting moving forward, an organizational relationship between the participants and the user, a behavior and a social relationship of the participants regarding the user, and a preference of the user;
present the participants on a meeting user interface gallery by emphasizing the relevancy categories employing a spatial grouping scheme;
place a representation of the user next to the participants on the gallery to provide the user with a first person view of the participants; and
update the gallery during the meeting based on one or more of a modality of participation by the participants, a change of modality, an activity within each modality by the participants, a change in participants, an organizational relationship between a new participant and the user, a behavior and a social relationship of a new participant with the user, and an input from the user.

15. The computing device of claim 14, wherein the gallery includes at least two rows of participant representations with the higher rows representing more relevant participants.

16. The computing device of claim 14, wherein the online meeting presentation application is further configured to retrieve:
the history of participation and the likelihood of participation from an online meeting service;
the organizational relationship between the participants and the user from a directory service;
the behavior and the social relationship of the participants regarding the user from a social network service; and
the preference of the user from a local data source associated with the user.

17. The computing device of claim 14, wherein the online meeting presentation application is one of: a cloud-based service and a locally installed application in a client-server architecture.

18. The computing device of claim 14, wherein the gallery further presents information associated with at least one from a set of: a modality for each participant, a role of each participant, and a category of each participant.

19. A computer-readable memory device with instructions stored thereon for presenting participants of a meeting according to their relevancy, the instructions comprising:
determining the participants of the meeting;
categorizing the participants according to their relevancy for a user based on one or more of: a history of participation by the participants in similar meetings, a likelihood of participation of the participants in the meeting moving forward, an organizational relationship between the participants and the user, a behavior and a social relationship of the participants regarding the user, and a preference of the user;

presenting the participants on a meeting user interface gallery by emphasizing the relevancy categories employing at least one from a set of: a spatial grouping scheme, a shading scheme, a color scheme, a graphical scheme, and a textual scheme;

placing a representation of the user next to the participants on the gallery to provide the user with a first person view of the participants; and updating the gallery during the meeting based on one or more of a modality of participation by the participants, a change of modality, an activity within each modality by the participants, a change in participants, an organizational relationship between a new participant and the user, a behavior and a social relationship of a new participant regarding the user, and an input from the user.

20. The computer-readable memory device of claim 19, wherein the gallery includes a "standing" row representing most relevant participants and a "sitting" row below the "standing" row representing less relevant participants, and wherein each participant is represented through one of: an avatar, an image, and a video feed.

* * * * *